(No Model.)
E. C. ATKINS.
SAW.
No. 561,079.  Patented June 2, 1896.
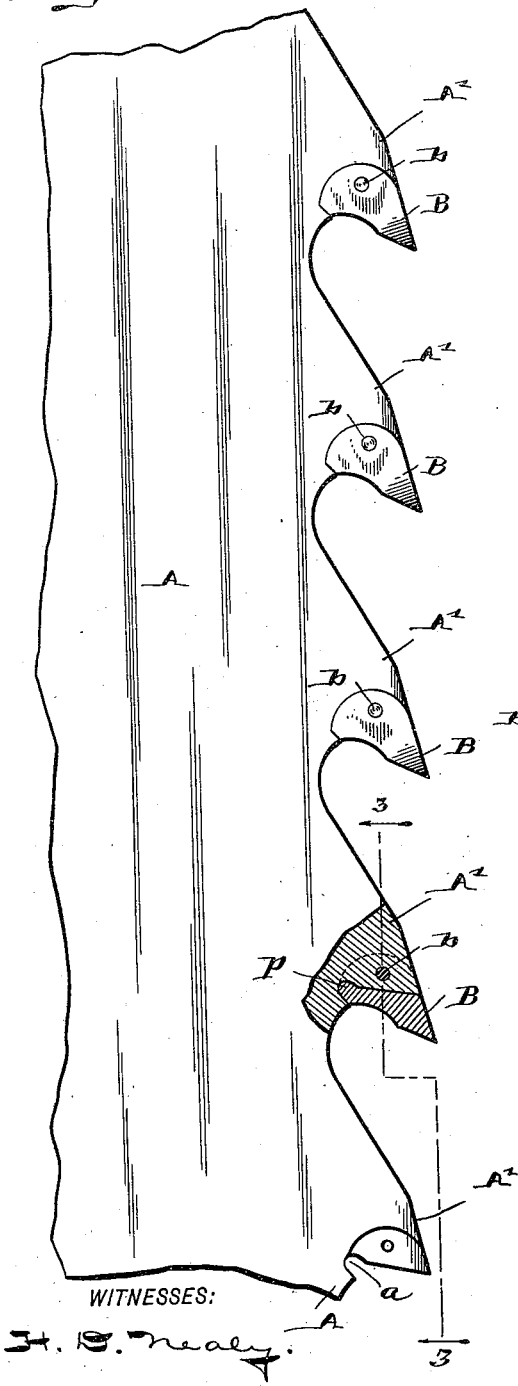
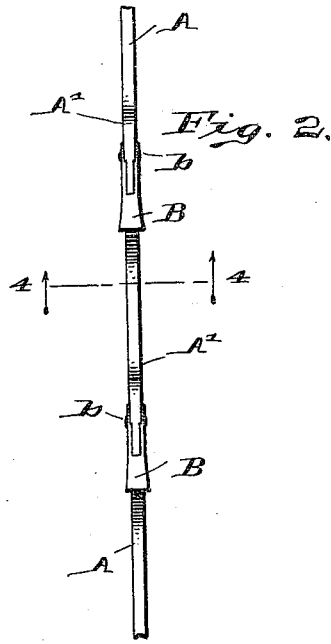
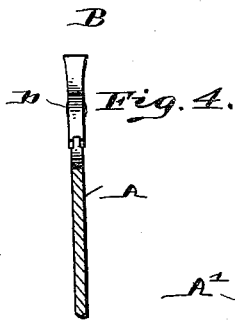
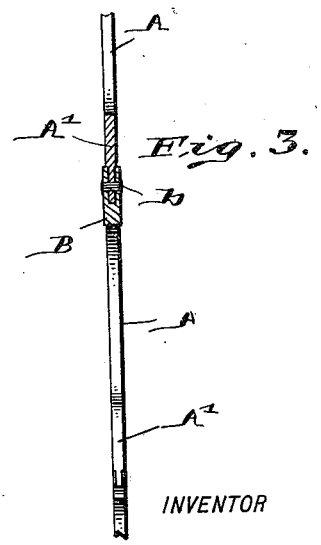
WITNESSES:
INVENTOR
Elias C. Atkins,
BY Chester Bradford,
ATTORNEY.

UNITED STATES PATENT OFFICE.

ELIAS C. ATKINS, OF INDIANAPOLIS, INDIANA.

SAW.

SPECIFICATION forming part of Letters Patent No. 561,079, dated June 2, 1896.

Application filed March 29, 1895. Serial No. 543,678. (No model.)

*To all whom it may concern:*

Be it known that I, ELIAS C. ATKINS, a citizen of the United States, residing at Indianapolis, in the county of Marion and State of Indiana, have invented certain new and useful Improvements in Saws, of which the following is a specification.

The object of my said invention is to improve that class of removable saw-teeth or tooth-points which are bifurcated and embrace the shanks on the saw-blade which supports them in such a manner that superior rigidity and strength may be secured, while the removal and replacement thereof are facilitated.

A saw provided with or embodying my said invention will be first fully described, and the novel features thereof then pointed out in the claim.

Referring to the accompanying drawings, which are made a part hereof and on which similar letters of reference indicate similar parts, Figure 1 is a side elevation of a fragment of a reciprocating saw provided with teeth of the class stated, said saw and teeth embodying my said invention; Fig. 2, a front edge elevation of the same; Fig. 3, a detail view, partly in section, as seen from the dotted line 3 3 in Fig. 1; and Fig. 4, a transverse sectional view looking upwardly from the dotted line 4 4 in Fig. 2.

In said drawings the portions marked A represent the saw-blade, and B the removable tooth-points or cutting portions attached thereto.

In its ordinary form the saw-blade A is of substantially the ordinary construction, except that its tooth-shanks A' do not extend or embody the cutting portions or points of the teeth, but are formed instead to receive and support such cutting points or portions. The forward or lower edges of the tooth-shanks A' are bounded by a straight line throughout the greater portion thereof, as shown at the lower portion of Fig. 1, and are provided with notches $a$ at the lower end of said straight portion, while the sides above said notches $a$ for a distance extending back from said edges are cut or scarfed away, so that the immediate points where the tooth-points or cutting portions B are secured thereto shall be thinner than the body of the saw. The recesses formed by this cutting or scarfing away of the sides receive the wings upon the cutting or tooth portions B, and the edges of said recesses form abutments against which said wings rest, and whereby the supporting of said cutting portions or tooth-points is materially aided. These recesses are on circular lines, as shown, and are preferably formed by the use of a circular milling-tool. Such recesses can be easily formed, as shown, so as to be overhung by a portion of the metal of the saw-plate, whereby the tooth-points are much more efficiently supported than they would be where the tooth-shanks were merely beveled off. This circular form of the shoulder to the recess and corresponding form of the edge of the wing of the tooth-point that fits therein is another advantage, in that said wings constitute braces between said tooth-points and the shoulders with what might be termed "universal" seats—that is, said braces are adapted by said curved form of seat to support said tooth-points against the strain of work coming from any direction. Thus should the strain be entirely upon the extreme point of the tooth or should it from any cause be partly or wholly shifted from said point, thereby changing the line of the direction of said strain, nevertheless said braces will always find a firm seat upon said shoulders at a point at right angles with the direction of strain. Much support is also derived from the notches $a$, into which the extreme lower ends of the cutting portions or tooth-points B extend.

The cutting portions or tooth-points B are not in themselves, broadly, of my invention. They are formed, as shown, to fit against the forward sides of the tooth-shanks A' and are provided at the extreme lower ends with projections $p$, as shown near the lower end of Fig. 1, which fit into the notches $a$ in the saw-plate. The wings of these cutting tooth-points or portions fit neatly into the recesses formed by the scarfing or cutting away of the sides of the tooth-shanks. These wings in practice are to be but little thicker than the depth of the recesses in the saw-plate. In the drawings they are somewhat exaggerated for clearness of illustration. Obviously, by means of this construction tooth-points more nearly approximating the thickness of the saw-blade can be used than where the opening between the two wings thereof must be of the same thickness as the whole thickness of the saw-blade, as in former constructions with which I am acquainted, and which cause a much thicker kerf in the wood than is necessary when my improved construction is used. The recesses $a$ and projections $p$ also form an important feature of my invention, as they, together with the recesses in the sides of the tooth-shanks into which the wings of the cutting portions or tooth-points fit, form a sufficiently secure union, so that but one rivet is commonly necessary to complete the attachment, whereas in previous constructions two or more were necessary. This is a matter of considerable importance in removing worn-out tooth-points and replacing them with new ones, as but one rivet has to be cut or punched out instead of two or more, as heretofore. However, I do not mean to be understood as limiting myself altogether to the use of a single rivet, as, manifestly, if two or more are used my invention would not thereby be otherwise departed from. It is, however, a matter of considerable consequence in the practical use of such saws, for, as is well known, these small tooth-points when used have frequently to be replaced, and any means by which the amount of riveting required is reduced is of great advantage.

The notches $a$ and projections $p$ are of much importance even when two or more rivets are used, as they serve to secure that the tooth-points shall be more nearly supported by a direct bearing upon the saw-plate, and, obviously, the more nearly a saw with removable teeth can be made to approximate the condition of a saw with integral teeth the more perfect and reliable will be its work when in use. The abutments produced by scarfing or cutting away the sides of the tooth-shanks, against which the wings of the tooth-points rest, also contribute much to this result.

Having thus fully described my said invention, what I claim as new, and desire to secure by Letters Patent, is—

The combination, of a saw-plate having tooth-shanks formed thereon which are cut or scarfed away on their sides, back from their points, on curved lines, forming curved shoulders or abutments in the sides of said tooth-shanks, a recess $a$ being formed in said plate at the base of each of said tooth-shanks, on its under side, and bifurcated tooth-points mounted on said shanks, the wings of which fit into the said recesses and are formed with curved edges adapted to fit into and bear against said curved shoulders or abutments, and each being formed with a projection $p$ at its inner end adapted to fit into the recess $a$, all substantially as described and for the purposes specified.

In witness whereof I have hereunto set my hand and seal, at Indianapolis, Indiana, this 26th day of March, A. D. 1895.

ELIAS C. ATKINS. [L. S.]

Witnesses:
 CHESTER BRADFORD,
 JAMES A. WALSH.